No. 637,206. Patented Nov. 14, 1899.
F. H. HEATH.
BALL BEARING.
(Application filed Oct. 12, 1898.)
(No Model.) 2 Sheets—Sheet 1.
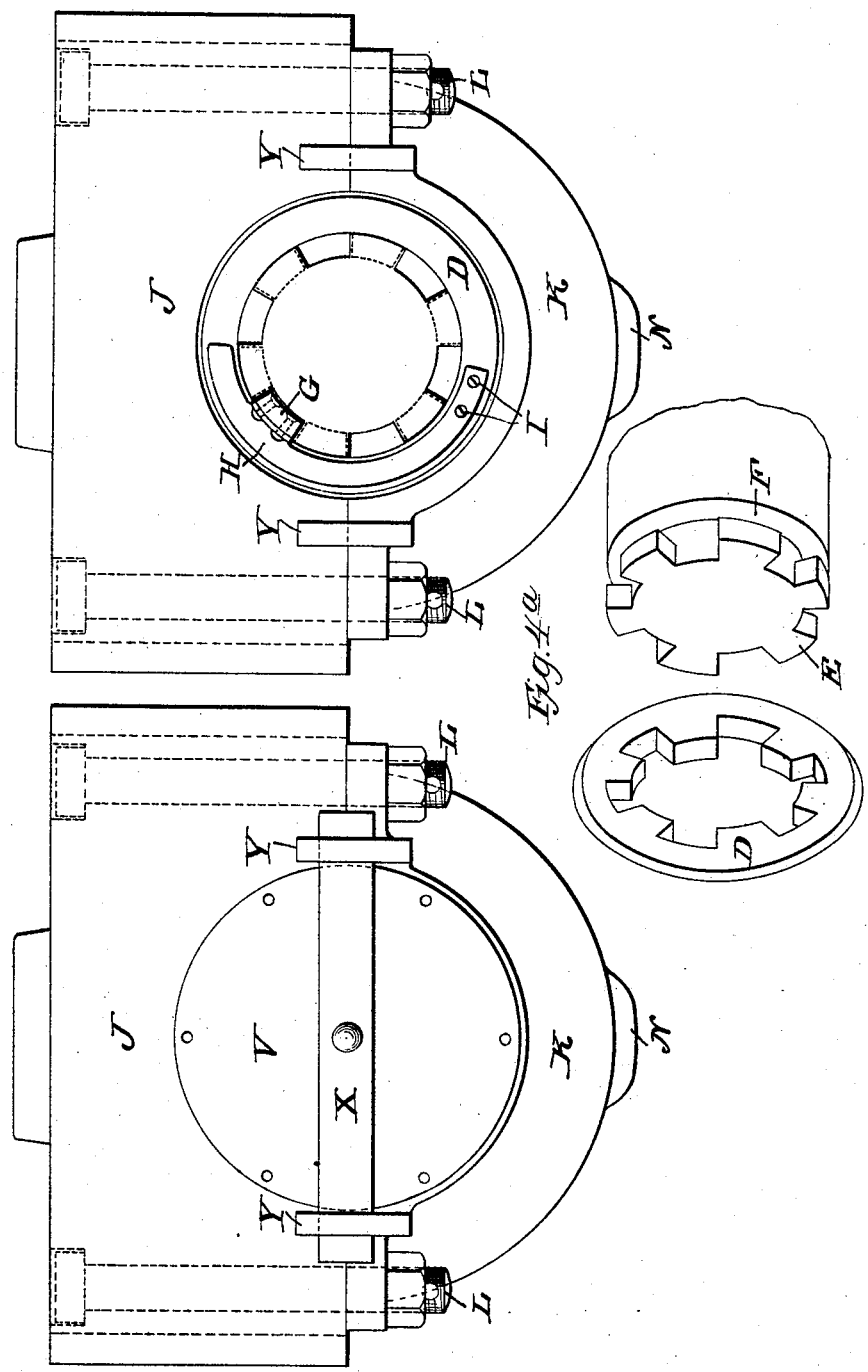
Witnesses
Cha. M. Cutcheon
Amos W Hart
Inventor
Frederick H. Heath
By Munn & Co.
Attorneys
THE NORRIS PETERS CO., PHOTO-LITHO., WASHINGTON, D. C.

No. 637,206. Patented Nov. 14, 1899.
F. H. HEATH.
BALL BEARING.
(Application filed Oct. 12, 1898.)
(No Model.) 2 Sheets—Sheet 2.
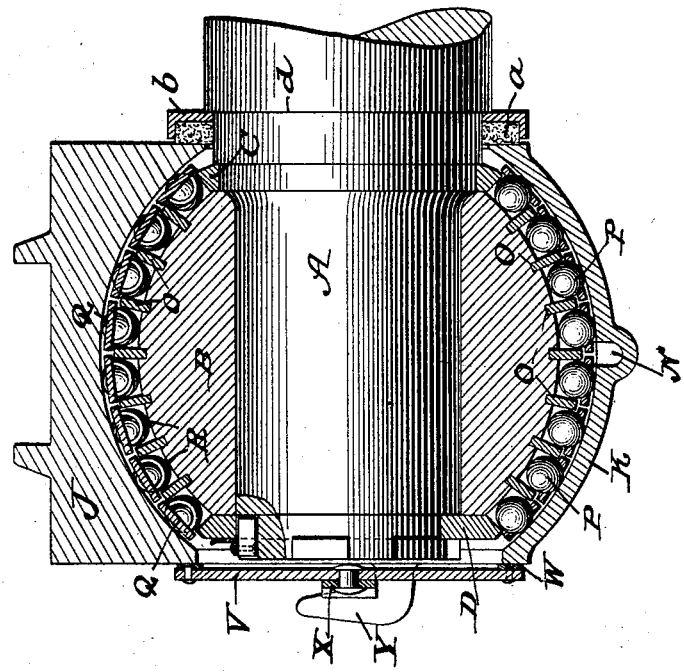
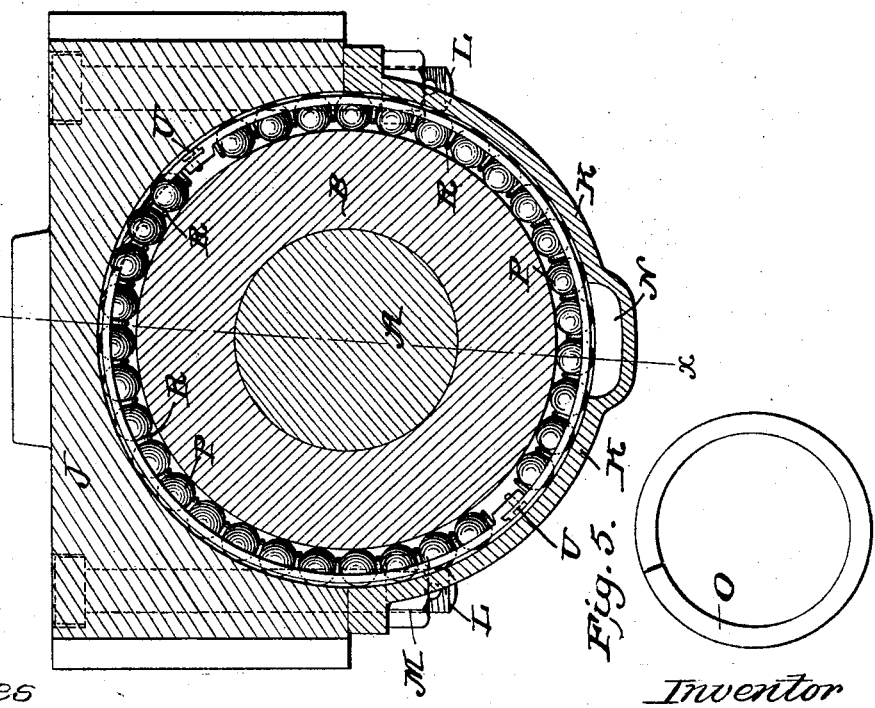
Witnesses
Chas. M. Cutchen
Amos W. Hart
Inventor
Frederick H. Heath
By Munn & Co.
Attorneys
THE NORRIS PETERS CO., PHOTO-LITHO., WASHINGTON, D. C.

UNITED STATES PATENT OFFICE.

FREDERICK H. HEATH, OF TACOMA, WASHINGTON.

BALL-BEARING.

SPECIFICATION forming part of Letters Patent No. 637,206, dated November 14, 1899.

Application filed October 12, 1898. Serial No. 693,325. (No model.)

*To all whom it may concern:*

Be it known that I, FREDERICK H. HEATH, a citizen of the United States, residing at Tacoma, in the county of Pierce and State of Washington, have invented a certain new and useful Improvement in Ball-Bearings for Car-Axles and the Like, of which the following is a specification.

My invention relates to a new and useful improvement in ball-bearings for car-axles and the like, and has for its object to so construct the journal and journal-boxes and combine therewith series of balls as to greatly reduce the friction incident to the ordinary manner of journaling car-axles; and a further object of my invention is to so construct a journal and bearing as to prevent cramping should the axle be sprung or out of true within certain limits and to compensate for unevennesses in the ordinary railway-track.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is an end view of a journal-box made in accordance with my improvement; Fig. 2, a similar view, the face-plate being removed, so as to show the end of the journal; Fig. 3, a cross-section of my improvement, illustrating the arrangement of the balls within the journal-box; Fig. 4, a section at the line $xx$ of Fig. 3. Fig. 4$^a$ is a perspective view of a means for locking or holding the spherical bearing and balls in place. Fig. 5 is a face view of one of the split or divided spring-rings.

In carrying out my invention as here embodied A represents the journal of an ordinary car-axle, having secured thereon a spherical bearing B, which should be of hardened steel, and in practice this bearing may be secured upon the journal by hydraulic pressure after being hardened or in any other manner which will serve the purpose. A hardened ring C, having a beveled surface, is secured upon the journal inside of the spherical bearing, and a similar ring D may be secured upon the outer end of the journal, and the last-named ring may serve to prevent the spherical bearing from being displaced endwise.

The manner of securing the ring D upon the journal, as here shown, is to form a series of teeth or projections E upon the outer end of the journal in such manner as to leave a space or groove between the inner surface of the teeth and the shoulder F upon the journal and to form corresponding teeth upon the ring D, so that by passing this ring over the teeth upon the journal until it reaches the groove, which corresponds in thickness to said ring, and turning the ring upon its axis sufficiently to carry the teeth thereof behind the teeth of the journal it will be held against endwise movement. The ring D is held against rotation after being thus placed by a block G of the proper dimensions to fit between two teeth upon the journal, and this block is secured to the spring-strip H, which in turn is secured to the ring D by screws or rivets, as indicated at I. By this arrangement it will be seen that when the ring D, is secured in place it cannot be displaced except by the removal of the block G and the turning of the ring upon its axis to cause its teeth to correspond with the spaces between the teeth upon the journal, and so long as the ring is held in place it in turn will hold the spherical bearing against endwise displacement.

J represents the upper half of the journal-box, which is of hardened steel, the inner portion thereof being concaved upon spherical lines to correspond with the spherical bearing B, and K is the lower portion of this box, which is likewise concaved upon spherical lines, and this lower half of the box is secured to the upper half by means of the bolts L and the nuts M run thereon. A pocket N is formed in the lower section to act as a catch for grit or dirt or other foreign substances which may gain access to the journal and which will by gravity tend toward this pocket, and, if desired, an outlet may be connected with this pocket for withdrawing said foreign substances as occasion may require.

A series of spacing-rings O are set in grooves formed in the spherical bearing and serve to separate the series of balls P, which are interposed between this spherical bearing and the inner surface of the journal-box, as clearly shown, the object being to confine each series of balls, and thereby avoid one series from interfering with another and to cause them to track, the rings C and D serving to sustain the two outer series of balls.

The spacing-rings O are constructed of steel and divided transversely, (see Fig. 5,) so that they may be sprung into circumferential grooves in the spherical bearing, and it is apparent they may be readily removed from position by reason of the same features of construction.

In Figs. 3 and 4 I have shown cage-rings Q, having holes therein for the reception of the balls, and these rings also have wire loops or staples R projecting inward therefrom, which further serve to inclose each of the balls, the object being to maintain the balls at a given distance from each other during their travel and to provide for readily placing a series of balls in position or removing the same in connection with the cage-rings—as, for instance, a series of balls may be placed in the cages of these rings by forcing them between the wire staples, and they will there be sufficiently held to be placed in position as a series or they may be removed as such or any one or all of the balls may be removed from the ring by exerting sufficient force thereon to spring open the wire staples, as will be readily understood. These cage-rings are made in two sections, the ends of each section being secured together by the screws U, the heads of which may be soldered after being turned into place, so as to prevent them from being shaken loose.

The front end of the journal-box is closed by the face-plate V, having a rubber or other suitable washer W attached thereto, so as to fit against the face of the journal-box to exclude dust and foreign matter therefrom, the face-plate being held in position by a spring-bar X, the ends of which are forced into engagement with the hooked lugs Y, formed upon the lower half of the journal-box. This provides a convenient means for closing the front end of the journal-box and one which permits of the ready removal of the face-plate for introducing oil or for inspecting the journal. The box is made dust-proof at its inner side by a felt or other suitable washer *a* being fitted around the journal and against the inner face of the box, said washer being held in place by the flange-ring *b*. In practice I prefer that this ring shall be of spring material and divided transversely in order that it may be sprung into place or sprung from the shoulder *d* of the journal, thus permitting access to the washer for its removal when occasion requires.

In practice a small quantity of oil introduced into the box is sufficient to lubricate the journal, and as the box is sealed this oil cannot escape, and therefore there is no waste of oil, and the particular shape of the journal and box is such as to cause the balls to practically travel in oil, and thereby prevent heating or cutting under high speeds and heavy loads.

It will be obvious to any one familiar with journals and their bearings that should an axle become sprung or bent within certain limits the balls will not cramp between the bearing-surfaces, since the spherical bearing B will always present a true circular path for the balls, thereby giving each ball its proportionate amount of pressure to sustain, which is of great importance in car-axle journals and the like when high pressures are exerted upon the bearing-surface and the journal runs at a high rate of speed.

Having thus fully described my invention, what I claim as new and useful is—

1. A journal and box for car-axles and the like, consisting of a spherical bearing rigidly carried by the axle, a series of spacing-rings arranged around said bearing, series of balls confined between said spacing-rings, two sections forming a journal-box, each of said sections being concaved upon spherical lines to correspond with the journal-bearing, a face-plate, a compressible washer carried thereby and fitted against the face of the journal-box, a spring-bar adapted to hold the face-plate in position, and hooked lugs with which said bar may engage, as and for the purpose set forth.

2. In combination, a car-axle, a spherical bearing secured therewith, means for holding said bearing in position, a series of spacing-rings sprung into grooves formed in the journal-bearing, a journal-box consisting of two sections, the upper section being of hardened steel having its interior concaved upon spherical lines, the lower section being likewise concaved and having a pocket therein, the two sections being secured together by bolts and nuts, series of balls interposed between the inner surface of the journal-box and the bearing, a ring C fitted upon the journal and serving to confine the inner series of balls, and a ring D fitted upon the outer end of the journal and adapted to confine the outer series of balls, as and for the purpose set forth.

3. In combination, a car-axle, a journal-bearing fitted thereon, cylindrical-shaped teeth or projections formed upon the outer end of the journal, a ring having corresponding teeth thereon adapted to pass between the teeth upon the journal and when in position to be turned upon its axis in such manner as to cause the two sets of teeth to engage to prevent endwise movement of the ring, a bearing adapted to fit between two of the teeth upon the journal, and a spring-strip to which said bearing is secured, said strip being in turn secured to the ring, as and for the purpose set forth.

4. In combination, a car-axle journal, having a spherical bearing, and teeth which are formed upon the end of the journal, a ring having corresponding teeth formed therein so as to pass between the teeth upon the journal and be turned behind the latter to prevent endwise displacement, means for securing this ring in position, a series of spacing-rings split and sprung into grooves formed in the journal-bearing, a journal-box composed of an upper and a lower section secured together by bolts and nuts, said box having its interior concaved upon spherical lines, series of balls located between the spacing-rings and interposed between the bearing-surface, a face-plate, a spring-bar for holding said plate against the outer face of the journal-box, hooked lugs with which said bar is adapted to engage, a washer-ring adapted to bear against the inner face of the box, and a divided flanged ring adapted to hold the last-named washer-ring in position, as and for the purpose set forth.

5. In combination with a journal, a spherical journal-bearing secured thereon, a series of divided resilient spacing-rings secured upon the journal-bearing, series of balls placed between the spacing-rings, cage-rings having holes therein to partly inclose the balls, staples or loops carried by said rings to further inclose the balls, and a suitable journal-box surrounding the bearing, as specified.

In testimony whereof I have hereunto affixed my signature in the presence of two subscribing witnesses.

FREDERICK H. HEATH.

Witnesses:
W. G. HELLER,
CHAS. MCCUTCHEON.